US010212769B2

(12) United States Patent
Chen et al.

(10) Patent No.: US 10,212,769 B2
(45) Date of Patent: Feb. 19, 2019

(54) DRIVER CIRCUIT FOR AN LED LIGHTING TUBE, LED LIGHTING TUBE AND METHOD FOR PROVIDING A CONTROLLED DC OUTPUT POWER

(71) Applicant: LEDVANCE GmbH, Garching bei Munich (DE)

(72) Inventors: Shaoping Chen, Shenzhen Guangdong (CN); ShiYu Ding, Shenzhen Guangdong (CN); Hui Ye, Shenzhen Guangdong (CN)

(73) Assignee: LEDVANCE GMBH, Garching Bei Munchen (DE)

( * ) Notice: Subject to any disclaimer, the term of this patent is extended or adjusted under 35 U.S.C. 154(b) by 0 days.

(21) Appl. No.: 15/837,624

(22) Filed: Dec. 11, 2017

(65) Prior Publication Data
US 2018/0235043 A1 Aug. 16, 2018

(30) Foreign Application Priority Data

Feb. 14, 2017 (CN) .......................... 2017 1 0078082

(51) Int. Cl.
H05B 37/00 (2006.01)
H05B 33/08 (2006.01)
F21Y 103/10 (2016.01)
F21Y 115/10 (2016.01)
F21K 9/278 (2016.01)

(52) U.S. Cl.
CPC ..... H05B 33/0815 (2013.01); H05B 33/0842 (2013.01); *F21K 9/278* (2016.08); *F21Y 2103/10* (2016.08); *F21Y 2115/10* (2016.08); *H05B 33/089* (2013.01)

(58) Field of Classification Search
CPC .............. H05B 33/0815; H05B 33/089; H05B 33/0842; F21Y 2103/10; F21Y 2115/10; F21K 9/278
USPC ...................................................... 315/200 R
See application file for complete search history.

(56) References Cited

U.S. PATENT DOCUMENTS

| 6,936,968 | B2 | 8/2005 | Cross et al. | |
| 9,402,293 | B2* | 7/2016 | Vaughan | H05B 33/0815 |
| 2012/0013268 | A1* | 1/2012 | Chou | H02M 1/4225 |
| | | | | 315/301 |
| 2012/0081039 | A1* | 4/2012 | Yang | H05B 33/0815 |
| | | | | 315/307 |
| 2012/0139438 | A1* | 6/2012 | Soleno | H05B 33/0815 |
| | | | | 315/291 |
| 2012/0286696 | A1* | 11/2012 | Ghanem | H05B 33/0815 |
| | | | | 315/291 |

(Continued)

OTHER PUBLICATIONS

"Transition-Mode PFC Controller"; L6562; STMicroelectronics; Nov. 2005; p. 1-16.

(Continued)

*Primary Examiner* — Don Le
(74) *Attorney, Agent, or Firm* — Hayes Soloway PC

(57) ABSTRACT

The invention provides a driver circuit, an LED lighting tube and a method for providing a controlled DC output power. An open loop control is used for controlling the DC output power in the case that a voltage of an AC input power is in a first voltage range. A closed loop control is used for controlling the DC output power in the case that the voltage of the AC input power is in a second voltage range.

12 Claims, 3 Drawing Sheets

(56) References Cited

U.S. PATENT DOCUMENTS

2015/0173145 A1* 6/2015 Lee .................... H05B 33/0815
315/200 R
2016/0181927 A1* 6/2016 Chang .................... H02M 1/42
363/21.02

OTHER PUBLICATIONS

Adragna and Gattavari; "Flyback Converters With the L6561 PFC Controller"; Application Note; Jan. 2003; p. 1-11; STMicroelectronics; Italy.
"TL43xx Precision Programmable Reference"; Texas Instruments; Aug. 2004—Revised Jan. 2015; p. 1-76.

* cited by examiner

DRIVER CIRCUIT FOR AN LED LIGHTING TUBE, LED LIGHTING TUBE AND METHOD FOR PROVIDING A CONTROLLED DC OUTPUT POWER

CROSS-REFERENCE TO RELATED APPLICATIONS AND PRIORITY

This patent application claims priority from Chinese Patent Application No. 2017100780825 filed on Feb. 14, 2017. This patent application is herein incorporated by reference in its entirety.

BACKGROUND

The present invention relates to a driver circuit for an LED lighting tube, in particular for a retrofit LED lighting tube compatible with a luminaire with a CCG. The invention further relates to an LED lighting tube, in particular a retrofit LED lighting tube compatible with a luminaire with a CCG, and to a method for providing a controlled DC output current, in particular for providing the controlled DC output current necessary for a light engine of a retrofit LED lighting tube.

Fluorescent tube lamps have long been known as efficient lighting devices. Numerous buildings and streets are equipped with luminaires adapted to receive fluorescent tube lamps.

Fluorescent tube lamps are, however, negative differential resistance devices. In other words, the more current flows through them, the more the electrical resistance of the fluorescent lamp drops. Connected directly to a constant-voltage power supply such as the AC mains powerline (also referred to as powerline, household power, wall power, line power, the grid etc.), a fluorescent lamp would rapidly self-destruct due to the uncontrolled current flow. To prevent this, fluorescent lamps typically employ an auxiliary device, a so-called ballast, to regulate the current flow through the lamp. Typically, either a conventional ballast (also referred to as a magnetic ballast or a conventional control gear, CCG) or an electronic control gear (ECG) is used.

Figure 4:
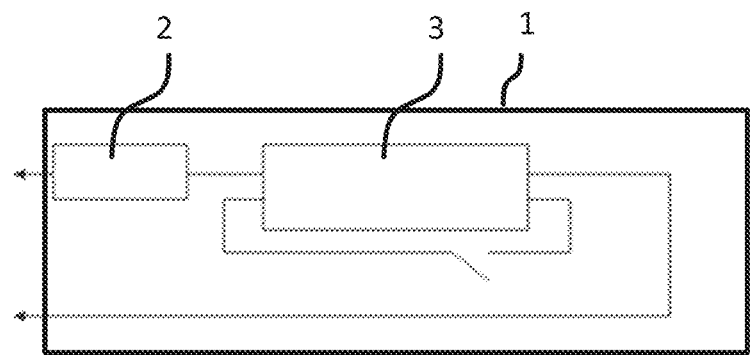

FIG. 4 schematically shows a CCG luminaire 1 comprising a CCG 2 and a single slot for a lighting tube ("single slot luminaire") with a single retrofit LED lighting tube 3 installed in said slot. The arrows mark where the luminaire 1 would be connected to the AC mains powerline.

Because of their even more energy-efficient function, there is a growing demand for retrofit LED tubes. Retrofit LED tubes are lighting devices employing highly efficient LED light engines comprising LEDs (light-emitting diodes) as light sources. Retrofit LED tubes are usable in existing luminaires in the same way as a fluorescent tube lamp would be used.

In U.S. Pat. No. 6,936,968 B2, a retrofit light emitting diode tube with an elongated cylindrical transparent envelope, a base cap at each end of the envelope, and at least one LED device in electrical communication with the base cap is described.

Frequently, luminaires are provided with slots for more than one lighting tube, for example, for two lighting tubes. Such luminaires are sometimes called tandem circuitry luminaires (or "tandem luminaires") and may comprise a single CCG and two slots for lighting tubes, by which two lighting tube are connectable in electrical series with each other and the CCG.

Figure 5:
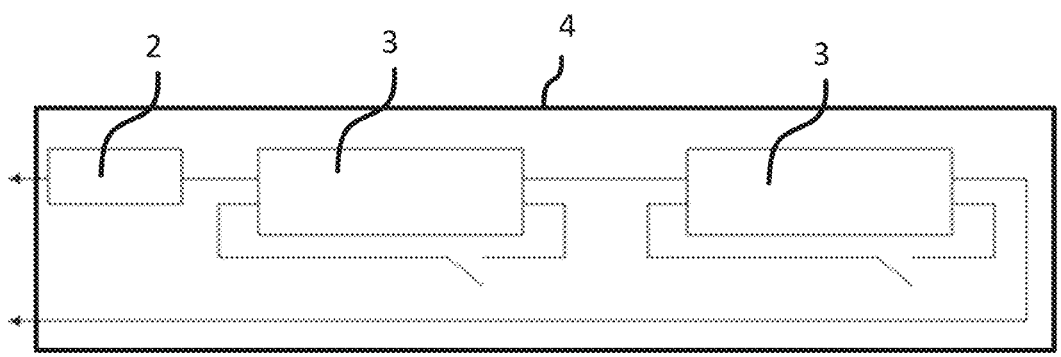

FIG. 5 schematically shows a CCG tandem luminaire 4 comprising a CCG 2 and two slots for LED lighting tubes with two retrofit LED lighting tubes 3 installed in said two slots. The arrows mark where the tandem luminaire 4 would be connected to the AC mains powerline.

Each individual lighting tube comprises its own LED driver circuit (or simply "driver") intended to provide the optimal output current to the LED light engine of the respective lighting tube.

A large number of integrated circuits are known and commercially available that may be used in creating circuits for all kinds of applications, for example driver circuits.

One known integrated circuit is the L6562 integrated circuit by ST Microelectronics. The L6562 integrated circuit is a transition-mode PFC controller. Its datasheet Rev. 8 dated November 2005 is e.g. available at the following hyperlink:
www.st.com/resource/en/datasheet/L6562.pdf.

The L6562 integrated circuit is the successor model to the L6561 integrated circuit by ST Microelectronics. Applications of the L6561 integrated circuit for example in flyback converter circuit designs, are described e.g. in the application notes AN1060 by C. Adragna and C. Gattavari of June 2001 by ST Microelectronics, which are e.g. available at the following hyperlink: www.st.com/resource/zh/application_note/cd00004041.pdf.

Another known integrated circuit is the TL431 integrated circuit by Texas Instruments. The TL431 integrated circuit is a three-terminal adjustable shunt regulator. Its datasheet dated August 2004, revised January 2015, is available e.g. at the following hyperlink: http://www.ti.com/lit/ds/symlink/tl431.pdf.

It is desirable that a single type of LED lighting tube is usable both singly in a standard CCG luminaire with a single slot as well as in tandem, i.e. together with another lighting tube of equal design, in a tandem circuitry luminaire, without any loss of efficiency or function.

One object of the present invention is to provide an improved driver for an LED lighting tube which fulfils these requirements.

According to one aspect of the invention, a driver circuit for an LED lighting tube is provided, comprising: a set of external connecting pins for receiving an AC input power; a set of internal connecting pins for connecting the driver circuit to electric poles of a light engine and/or of at least one light-emitting diode; a transformer circuit, wherein the set of external connecting pins is arranged on a primary side of the transformer circuit and wherein the set of internal connecting pins is arranged on a secondary side of the transformer circuit; a controller circuit for controlling transmission of electrical energy from the primary side to the secondary side of the transformer circuit for providing a controlled DC output power at the set of internal connecting pins; wherein the driver circuit, in particular the controller circuit, is configured and arranged to control said transmission of electrical energy in an open loop control based on a parameter of the AC input power if the voltage of the AC input power is in a first voltage range; and wherein the driver circuit, in particular the controller circuit, is further configured and arranged to control said transmission in a closed loop control if the voltage of the AC input power is in a second voltage range.

By applying different control schemes (open loop or closed loop control) depending on different voltage values of the AC input power, the driver circuit makes it possible for LED lighting tubes provided with said driver circuit to be supplied with an optimum output current in at least two different scenarios which are characterized by, or determined based on, the voltage of the received AC input power.

In the foregoing and in the following, the word "connected" refers to an electric connection, i.e. a connection configured to transport electric signals between the connected elements, if the context does not explicitly state otherwise. The word "connected" may refer to either a direct and/or an indirect coupling if the context does not explicitly state otherwise.

According to another aspect of the invention, a method for providing a controlled DC output current is provided, the method comprising: receiving an AC input power at a primary side of a transformer circuit; controlling transmission of electrical energy from the primary side of the transformer circuit to a secondary side of the transformer circuit; and providing the controlled DC output current on the secondary side of the transformer circuit based on the transmitted electrical energy; wherein said transmission is controlled in an open loop control based on a parameter of the AC input power if the voltage of the AC input power is in a first voltage range; and wherein said transmission is controlled in a closed loop control if the voltage of the AC input power is in a second voltage range.

In some embodiments of the driver circuit according to the present invention, the first voltage range consists of lower voltage values than the second voltage range. In other words, all voltage values of the first voltage range may be smaller than every voltage value of the second voltage range. In particular, the first and the second voltage ranges may be directly adjacent to each other with no voltage values in between that are not associated with either of the two voltage ranges.

Preferably, the first voltage range is chosen such that in the scenario where two LED lighting tubes with said driver circuit are connected in series in a CCG tandem luminaire connected to the AC mains powerline, the voltage of the AC input power received at the set of external connecting pins of each of the driver circuits of the two LED lighting tubes falls within the first voltage range so that an open loop control is applied.

The second voltage range is, equally preferably, chosen such that, when the same LED lighting tube with the same driver circuit is installed singly in a single slot CCG luminaire, the voltage of the AC input power received at the set of external connecting pins of the driver circuit of said single LED lighting tube falls within the second voltage range so that a closed loop control is applied.

The first voltage range may be defined such as to contain the voltage value of 115V, whereas the second voltage range may defined such as to contain the voltage value of 230V. For example, the first voltage range may be defined as from 0V to 198V, 198V being excluded, and the second voltage range may be defined as from 198V to 264V, 198V being included. The first and the second voltage range may be set in particular by choosing resistance values of a first sensing resistor on the primary side of the transformer, and of a second sensing resistor on the secondary side of the transformer.

In this way, the driver circuit indirectly reacts to the type of luminaire (i.e. single-slot or tandem) in which the LED lighting tube with said driver circuit is installed, and automatically the optimal controlling scheme (open loop or closed loop control) for controlling the DC output power is applied.

In the case of the tandem scenario, i.e. when two LED lighting tubes with the driver circuit according to the present invention are installed in one CCG tandem luminaire, the respective DC output currents to the light engines of the two lighting tubes may be controlled to be equal so that the two lighting tubes emit the same amount of light.

In some embodiments of the driver circuit, the closed loop control is based on a parameter of the DC output power, preferably on a current value of the DC output power. In this way, the control may be especially precise. The current value of the DC output power can e.g. be determined from a voltage drop over a sensing resistor.

In some embodiments, the driver circuit comprises a rectifier circuit connected to the set of external connecting pins for rectifying the AC input power received at the external connecting pins. The open loop control may be based on a parameter of the AC input power derived from a voltage of the rectified input power.

In some embodiments, the driver circuit comprises a sampling resistor arranged to carry the rectified input power. The parameter of the AC input power, on which the open loop control is based, is a preferably voltage drop between the sampling resistor and ground.

In some embodiments, the driver circuit comprises a switching circuit driven by the controller circuit and configured to switch a current through a winding of the primary side of the transformer circuit. The open loop control may be based on, or be dependent from, a voltage drop between the switching circuit and ground, e.g. at a sensing resistor.

Figure 1:
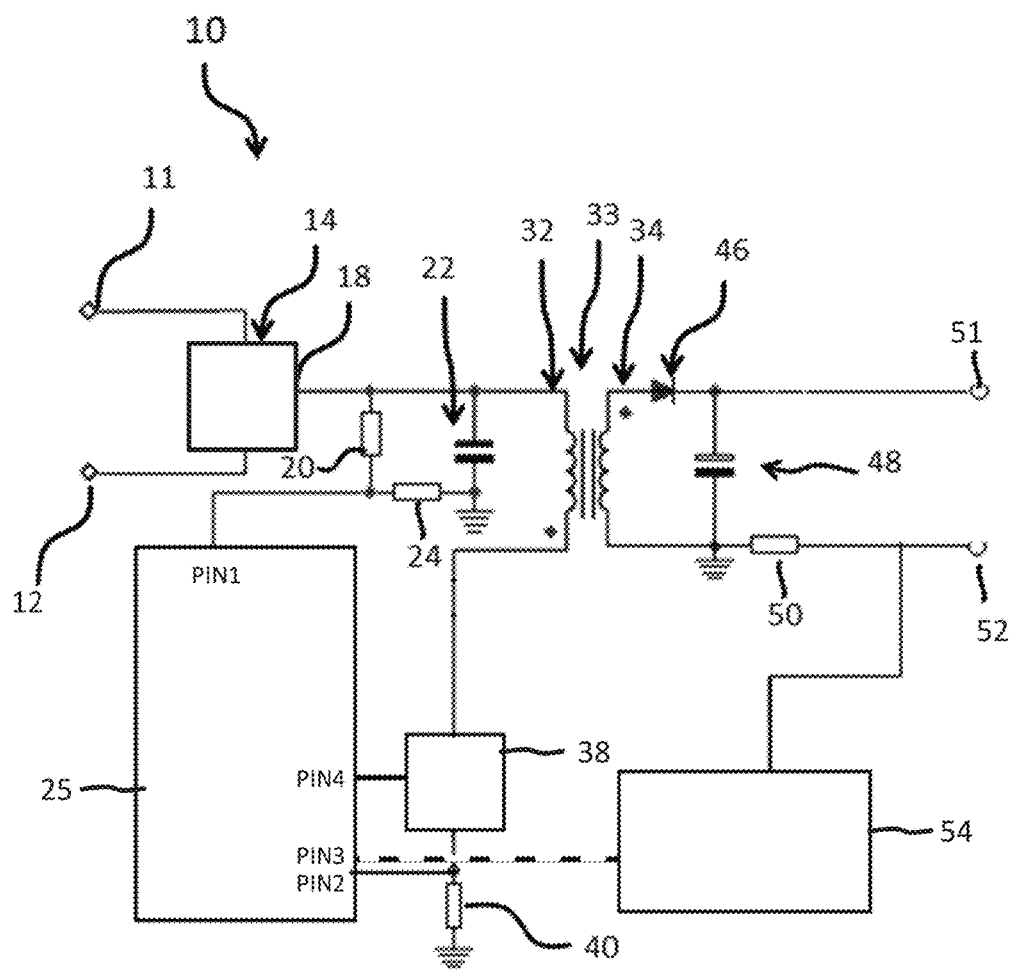
Figure 2:
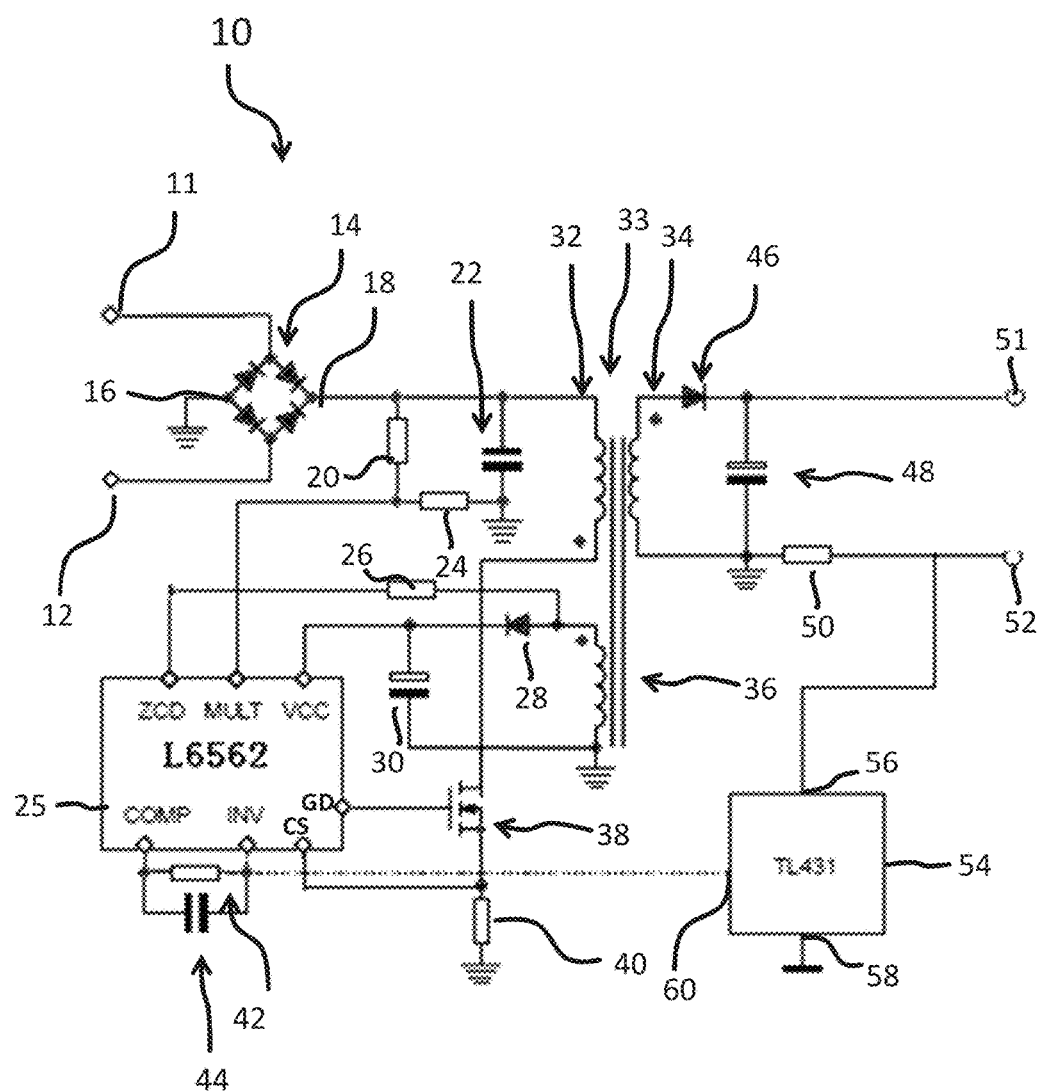

FIGS. 1 and 2 show schematic illustrations of driver circuits according to embodiments of the present invention. FIGS. 1 and 2 further serve to illustrate a method for providing a controlled DC output current, in particular to an LED light engine of a retrofit LED lighting tube according to another embodiment of the present invention.

Figure 3:
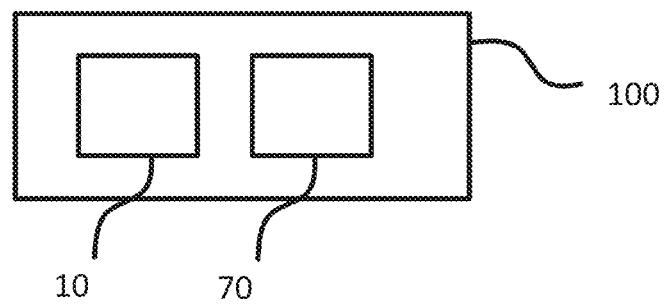

FIG. 3 schematically shows an LED lighting tube according to another embodiment of the present invention.

FIGS. 4 and 5 schematically show, as has been described above, a singled-slot luminaire and a tandem luminaire, respectively.

Elements that are identical, similar or have an identical or similar effect are provided with the same reference numerals in the figures. The figures and the size relationships of the elements illustrated in the figures among one another should not be regarded as to scale. Rather, individual elements may be illustrated with an exaggerated size to enable better illustration and/or better understanding.

With reference to FIG. 1, a first embodiment of a driver circuit 10 is described on the basis of schematic illustrations. It should be understood that the functions, concepts and steps described with respect to the driver circuit 10 can be seen as part of, or as forming, a method for providing a controlled DC output power according to one embodiment of one of the aspects of the present invention.

The driver circuit 10 comprises a first external connecting pin 11 and a second external connecting pin 12 for connecting the driver circuit 10 to a luminaire, in particular to a CCG luminaire which, in turn, may be connected to the AC mains powerline. The CCG luminaire may be a single-slot luminaire having a single slot for a lighting tube, or may be a tandem luminaire having two or more slots for lighting tubes.

The driver circuit 10 further comprises a rectifying circuit 14 configured to rectify an AC input power received between the first and the second external connecting pins 11, 12 to provide a rectified DC power at an internal node 18 of the driver circuit 10.

The driver circuit 10 also comprises a transformer circuit 33 with a primary winding 32 at a primary side of the transformer and a secondary winding 34 at a secondary side of the transformer circuit 33, wherein the first and the second side are galvanically isolated. The primary winding 32 and the secondary winding 34 are arranged with opposite polarity, or winding direction, as marked in FIG. 2 by the black dots.

At the secondary side of the transformer circuit 33, a first internal connecting pin 51 and a second internal connecting pin 52 of the driver circuit 10 are arranged. The first and the second internal connecting pins 51, 52 are directly or indirectly connected to, or configured for directly or indirectly connecting to, a light engine of an LED lighting tube. The first and the second internal connecting pins 51, 52 are used for providing a controlled DC output power to said light engine, as will be described in the following.

A controller circuit 25 of the driver circuit 10 is configured and arranged to drive a switching circuit 38 to switch a current stemming from the rectified current at the node 18 through the primary winding 32 on or off. As a result, a current through the secondary winding 34 at the secondary side may be switched on and off.

The switching may be performed as part of a pulse-width modulator function. In other words, the current through the primary winding 32 may be switched on and off according to a duty cycle so as to create, by transmission of corresponding electric energy via the transformer circuit 33, a desired output current at the secondary side, in particular at the first and second internal connecting pins 51, 52.

The controller circuit 25 is configured for controlling transmission of electrical energy from the primary side to the secondary side of the transformer circuit 33 by driving the switching element 38 accordingly. More specifically, the controller circuit 25 is configured and arranged to control said transmission in an open loop control based on a parameter of the AC input power if the voltage of the AC input power is in a first voltage range; and to control said transmission in a closed loop control if the voltage of the AC input power is in a second voltage range.

It has already been described above that in this way, the driver circuit 10 is advantageously configured to indirectly react to the type of luminaire (i.e. single-slot or tandem) in which a LED lighting tube with said driver circuit 10 is installed, and automatically the optimal way of controlling the DC output power is selected and applied.

For this goal, the first voltage range may be defined as from 0V to 198V, 198V being excluded, and the second voltage range may be defined as from 198V to 264V, 198V being included.

The controller circuit 25 is configured to receive, at a first pin PIN1, a first signal based on the rectified input power and to receive, at a second pin PIN2, a second signal based on a voltage drop at a first sensing resistor 40 connected between ground and a ground-side of the switching element 38.

The controller circuit 25 is further configured to receive, at a third pin PIN3, a third signal from the secondary side of the transformer circuit 33 as a feedback signal in the closed loop control. At a fourth pin PIN4, the controller circuit 25 outputs driving signals for driving the switching circuit 38 based on the first, the second and/or the third signal.

Between the first internal node 18 and the first pin PIN1 of the controller circuit 25, two branches are connected in parallel: the first branch comprises a first resistor 20, preferably only the first resistor 20. The other branch comprises a first capacitor 22 and a second resistor 24 connected in series. The node between the first capacitor 22 and the second resistor 24 is grounded, i.e. directly connected to ground. The first capacitor 22 is also referred to as an input capacitor $C_{IN}$.

The dotted end of the secondary winding 34 is connected, over a diode 46, to the first internal connecting pin 51. The non-dotted end of the secondary winding 34 is connected to ground. Between the first internal connecting pin 51 and the non-dotted end of the secondary winding 34, a capacitor 48 is connected in parallel to the series connection of the secondary winding 34 and the second diode 46. The second diode 46 is arranged such that it transmits a current from the dotted end of the secondary winding 34 towards the first internal connecting pin 51.

Between the non-dotted end of the secondary winding 34 and the second internal connecting pin 52, a second sensing resistor 50 is connected. Since the non-dotted end of the secondary winding 34 is connected to ground, the second sensing resistor may also be said to be connected between ground and the second internal connecting pin 52.

An electric node between the second sensing resistor 50 and the second internal connecting pin 52 is connected to a pin of a regulating circuit 54. The regulating circuit 54 is connected to the third pin PIN3 of the controller circuit 25. The dashed line between the regulating circuit 54 and the third pin PIN3 indicates that additional circuits may be provided in between.

In particular, a galvanic isolator such as an opto-isolator is provided between the third pin PIN3 and the regulating circuit 54 to keep the primary and the secondary side of the transformer circuit 33 galvanically isolated from each other.

When the voltage of the input power received at the external pins 11, 12 is high, i.e. within the second voltage range, then the regulating circuit 54 is configured to transmit a signal based on a voltage drop over the second sensing resistor 50, to the third pin PIN3. In other words, the controller circuit 25 is then set to a closed loop control with the signal received at the third pin PIN3 as a feedback signal. As has been explained above, the voltage of the input power being high, i.e. in the second voltage range, indicates that the lighting tube with the driver circuit 10 is installed singly in a single-slot luminaire.

If the voltage of the input power received at the external pins 11, 12 is low, i.e. within the first voltage range, then the controller circuit 25 is configured and arranged to perform an open loop control of the DC output current based on the signals at the first pin PIN1 and/or at the second pin PIN2.

The first and the second voltage range may be set in particular by choosing the resistance values of the first sensing resistor 40 on the primary side of the transformer circuit 33, and of the second sensing resistor 50 on the secondary side of the transformer circuit 33.

FIG. 2 shows a schematic circuit diagram of a driver circuit 10 according to another embodiment of the present invention. The driver circuit 10 may be configured exactly as shown in FIG. 2, that is, with all the elements as they are depicted in FIG. 2. The driver circuit 10 of FIG. 2 is a variation of the driver circuit 10 of FIG. 1, wherein some further details have been added. The description of elements that have already been described with respect to FIG. 1 is occasionally omitted.

The driver circuit 10 of FIG. 2 comprises, as a rectifying circuit, a bridge rectifier 14 formed as a diode bridge comprising at least four diodes. The bridge rectifier 14 comprises two branches with two diodes arranged in the same direction and in series each, the two branches connected between a grounded node 16 on the one end and an internal node 18 on the other hand. The first external connecting pin 11 is directly connected to a node between the two diodes on one branch of the bridge rectifier 14 and the second external connecting pin 12 is directly connected to a node between the two diodes on the second branch of the bridge rectifier 14.

The driver circuit 10 further comprises a transition-mode PFC controller circuit 25, or a current-mode PFC controller circuit operating in transition mode (TM). In particular, the transition-mode PFC controller may be the L6562 integrated circuit by ST Microelectronics or its predecessor, the pin-to-pin compatible L6561 integrated circuit. It should be understood that instead of the L6562 any other integrated circuit with the same or comparative functions may also be used in the driver circuit 10. For example, a pin-to-pin compatible successor integrated circuit of the L6562 integrated circuit may be used. In the following, the driver circuit 10 will be explained in more detail with reference to with the L6562 integrated circuit as the transition-mode PFC controller circuit 25.

The L6562 integrated circuit is configured with the following pins:
INV inverting input of an error amplifier
COMP output of the error amplifier
MULT main input to a multiplier
CS input of a PWM comparator
ZCD a boost inductor's demagnetization sensing input for transition-mode operation
GMD ground
GD gate driver output
VCC supply voltage of both a signal part of the integrated circuit and the gate driver.

For a detailed explanation of the pins as well as the entire function of the L6562 integrated circuit, reference is made to the data sheet of the L6562 integrated circuit cited above.

With respect to FIG. 1, the following identifications are made: the first pin PIN1 may be identified with the MULT pin of the L6562; the second pin PIN2 may be identified with the CS pin of the L6562; the third pin PIN3 may be identified with the INV pin of the L6562; and the fourth pin PIN4 may be identified with the GD pin of the L6562.

Between the first internal node 18 and MULT pin of the L6562, the first resistor 20, the first capacitor 22 and the second resistor 24 are connected as described with respect to FIG. 1.

The GD pin of the L6562 is connected to a gate pin of a field effect transistor 38 as one example of a switching circuit, in particular a metal-oxide-semiconductor field-effect transistor, or MOSFET. Between the internal node 18 and the drain of the field-effect transistor 38, the first primary winding 32 of the transformer circuit 33 of the driver circuit 10 is connected. The MOSFET 38 is preferably an N-channel MOSFET. Between a source of the field-effect transistor 38 and ground, the first sensing resistor 40 is connected.

A node between the source of the field-effect transistor 38 and the first sensing resistor 40 is connected to the CS pin of the L6562 integrated circuit, as described with respect to the second pin PIN2. Directly connected between the INV pin of the L6562 integrated circuit and the COMP pin of the L6562 integrated circuit, a third resistor 42 and a second capacitor 44 are connected in parallel.

Further connected between the ground and the VCC pin of the L6562 integrated circuit, a third capacitor 30 is connected. In parallel with the third capacitor 30, a second primary winding 36 and a first diode 28 are connected in series. The first diode 28 is arranged such that it transmits a current from the side of the second primary winding 36 towards the VCC pin of the L6562 integrated circuit.

A node electrically connected between the first diode 28 and the second primary winding 36 is, over a fourth resistor 26, connected to the ZCD pin of the L6562 integrated circuit. Over a common transformer core, the first primary winding 32 and the second primary winding 36 are magnetically coupled with the secondary winding 34. The winding direction, of the first primary winding 32 and the second primary winding 36 are opposite. The winding direction, or polarity, of the first primary winding 32 and the secondary winding 34 are opposite. Accordingly, the winding direction, or polarity, of the second primary winding 36 and the secondary winding 34 are equal, as indicated by the location of the black dots in the symbols for the windings 32, 34, 36.

The secondary side of the transformer circuit 33 is configured in the same way as described above with respect to FIG. 1.

The electric node between the second sensing resistor 50 and the second internal connecting pin 52 is connected to a pin of a three-terminal adjustable shunt regulator 54 as one example of a regulating circuit.

Preferably, the TL431 integrated circuit by Texas Instruments is used as the three-terminal adjustable shunt regulator 54. Regarding properties of the TL431 integrated circuit, it is referred to the datasheet of the TL431 integrated circuit cited above. It should be understood that instead of the TL431 integrated circuit, a wide range of other three-terminal adjustable shunt regulators may be used. In the following, the driver circuit 10 will be described further with reference to the TL431 integrated circuit as a preferred choice.

In said preferred choice, the electric node between the second sensing resistor 50 and the second internal connecting pin 52 is connected to a cathode pin 56 of the TL431 integrated circuit. An anode pin 58 of the TL431 integrated circuit is connected to ground. A reference pin 60 of the TL431 integrated circuit 54 is connected to the INV pin of the L6562 integrated circuit 25 indirectly by means of a connecting circuit, indicated by the dashed line in FIG. 2. The connecting circuit comprises a galvanically insulating circuit such as an octo-isolator. In this way, the primary and the secondary side of the transformer circuit 33 are kept galvanically isolated.

Regarding the functioning of the driver circuit 10 of FIG. 2, it is referred to the detailed description of the driver circuit 10 of FIG. 1.

FIG. 3 schematically shows an LED lighting tube 100 according to another embodiment of the present invention. FIG. 3 illustrates that the LED lighting tube 100 comprises a driver circuit 10 according to the present invention as well as an LED light engine 70 to which the driver circuit 10 is connected, via the internal connecting pins 51, 52, for providing the DC output power to supply at least one light-emitting diode (LED) of the LED light engine 70.

The invention is not restricted by the description based on the embodiments. Rather, the invention comprises any new feature and also any combination of features, including in particular any combination of features in the patent claims, even if this feature or this combination itself is not explicitly specified in the patent claims or exemplary embodiments.

Reference Numerals 1 single lighting tube CCG luminaire
2 CCG
3 LED lighting tube
4 tandem circuitry CCG luminaire
10 driver circuit 11 first external connecting pin
12 second external connecting pin
14 rectifying circuit
16 ground node
18 internal node
20 first resistor
22 first capacitor
24 second resistor
25 controller circuit
26 third resistor
28 first diode
30 third capacitor
32 first primary winding
33 transformer circuit
34 secondary winding
36 second primary winding
38 switching circuit
40 first sensing resistor
42 fourth resistor
44 second capacitor
46 second diode
48 fourth capacitor
50 second sensing resistor
51 first internal connecting pin
52 second internal connecting pin
54 regulating circuit
56 cathode pin
58 anode pin
60 reference pin
70 light engine
100 LED lighting tube

The invention claimed is:

1. A driver circuit for an LED lighting tube, the driver circuit comprising:
   a set of external connecting pins for receiving an AC input power;
   a set of internal connecting pins for connecting the driver circuit to electric poles of at least one LED light engine;
   a transformer circuit, wherein the set of external connecting pins is arranged on a primary side of the transformer circuit and wherein the set of internal connecting pins is arranged on a secondary side of the transformer circuit; and
   a controller circuit for controlling transmission of electrical energy from the primary side to the secondary side of the transformer circuit for providing a controlled DC output power at the set of internal connecting pins;
   wherein the controller circuit is configured and arranged to control said transmission in an open loop control when the at least one LED light engine comprises a plurality of light engines; and
   wherein the controller circuit is further configured and arranged to control said transmission in a closed loop control when the at least one LED light engine comprises only one light engine.

2. The driver circuit according to claim 1, wherein the open loop control operates at lower voltage values than the closed loop control.

3. The driver circuit according to claim 1, wherein the closed loop control is based on a parameter of the DC output power.

4. The driver circuit according to claim 3, wherein the closed loop control is based on a current value of the DC output power.

5. The driver circuit according to claim 1, further comprising a rectifier circuit connected to the set of external connecting pins for rectifying the AC input power,
   wherein a recognition of a number of the LED light engines connected to the driving circuit is derived from a voltage of a rectified input power.

6. The driver circuit according to claim 5, further comprising a sampling resistor arranged to carry the rectified input power,
   wherein the recognition of the number of the LED light engines connected to the driving circuit is based on a voltage drop between the sampling resistor and ground.

7. The driver circuit according to claim 1, further comprising a switching circuit driven by the controller circuit and configured to switch a current through a winding of the primary side of the transformer circuit,
   wherein the open loop control is based on a voltage drop between the switching circuit and ground.

8. An LED lighting tube comprising:
   an LED light engine with at least one light-emitting diode; and
   the driver circuit according to claim 1;
   wherein the set of internal connecting pins is connected to electric poles of the LED light engine.

9. A method for providing a controlled DC output current, the method comprising:
   receiving an AC input power at a primary side of a transformer circuit;
   controlling transmission of electrical energy from the primary side of the transformer circuit to a secondary side of the transformer circuit with a controller circuit;
   providing the controlled DC output current on the secondary side of the transformer circuit based on the transmitted electrical energy; and
   delivering the controlled DC output current to at least one light engine;
   wherein said transmission is controlled in an open loop control when the at least light engine comprises a plurality of light engines; and
   wherein said transmission is controlled in a closed loop control when the at least light engine comprises only one light engine.

10. The method according to claim 9, wherein the closed loop control is based on a parameter of a DC output power.

11. The method of claim 9, wherein the closed loop control includes a regulating circuit connected between the secondary side of the transformer circuit and the controller circuit.

12. The driver circuit according to claim 1, wherein the closed loop control further comprises a regulating circuit connected between the secondary side of the transformer circuit and the controller circuit.

* * * * *

UNITED STATES PATENT AND TRADEMARK OFFICE
CERTIFICATE OF CORRECTION

PATENT NO. : 10,212,769 B2
APPLICATION NO. : 15/837624
DATED : February 19, 2019
INVENTOR(S) : Chen et al.

Page 1 of 1

It is certified that error appears in the above-identified patent and that said Letters Patent is hereby corrected as shown below:

In the Claims

At Column 10, Line 44, in Claim 9:
control when the at least light engine comprises a
Should be:
control when the at least one light engine comprises a At Column 10, Line 47, in Claim 9:
control when the at least light engine comprises a
Should be:
control when the at least one light engine comprises a Signed and Sealed this
Thirteenth Day of August, 2019

Andrei Iancu
*Director of the United States Patent and Trademark Office*